United States Patent [19]

Sudar et al.

[11] 3,853,484
[45] Dec. 10, 1974

[54] COMPACT MUFFLER SCRUBBER

[75] Inventors: Seymour Sudar, Malibu; Frederick W. Poucher, Jr., Camarillo, both of Calif.

[73] Assignee: Rockwell International Corporation, El Segundo, Calif.

[22] Filed: Jan. 22, 1973

[21] Appl. No.: 325,974

[52] U.S. Cl............ 23/288 F, 23/284, 55/DIG. 30, 60/274, 60/299, 60/303, 261/DIG. 54, 261/116, 423/210.5, 423/212
[51] Int. Cl.............................. F01n 3/16, B01j 9/04
[58] Field of Search............ 23/288 F, 284; 60/274, 60/299, 303; 55/DIG. 30; 261/DIG. 54, 116; 423/210.5, 212

[56] References Cited
UNITED STATES PATENTS

| | | | |
|---|---|---|---|
| 3,556,734 | 1/1971 | Peterson............................ | 23/284 X |
| 3,563,029 | 2/1971 | Lowes................................ | 23/284 X |
| 3,647,394 | 3/1972 | Wetch et al....................... | 23/288 F |

*Primary Examiner*—James H. Tayman, Jr.
*Attorney, Agent, or Firm*—L. Lee Humphries; Clark E. DeLarvin; Henry Kolin

[57] ABSTRACT

A compact muffler, scrubber or chemical reactor device for utilization with a combustion engine to aid in the removal of impurities from exhaust gases comprises a housing in which serially connected shallow reactant and demister compartments are horizontally arranged. An inlet line is provided which opens into the reactant compartment. The reactant compartment contains a body of reactant material and packing. The inlet line to the reactant compartment contains a venturi and an aspirator line for aspirating the reactant material into the venturi. These are so located in the upstream end of the compartment as to provide a pressure gradient which is utilized to return the reactant material to the bottom of the reactant compartment through selected orifices which also serve as surge suppressors in the muffler device.

8 Claims, 6 Drawing Figures

3,853,484

COMPACT MUFFLER SCRUBBER

BACKGROUND OF THE INVENTION

This invention relates to a muffler device useful for removing impurities from exhaust gases produced by combustion engines, while serving the acoustic function of a standard muffler. The invention particularly relates to a compact muffler device useful for the removal of impurities from exhaust gases by contacting the gases with a liquid scrubbing medium, such as a molten salt mixture, liquid metals, organic sorbents, or aqueous solutions, while meeting the stringent requirements of short residence times and shallow spatial configurations characterizing modern automotive mufflers.

In copending application Ser. No. 13,248, filed Feb. 20, 1970, there is disclosed a process for the removal of impurities including nitrogen oxides, lead halides, organic sulfur compounds, and solid particulate matter such as carbonaceous substances and the like from automotive exhaust gases by contacting the exhaust gas with a molten salt mixture comprised of alkali metal carbonates. In copending application Ser. No. 13,245, filed Feb. 20, 1970, there is additionally disclosed various muffler designs which are useful for practicing the process for removal of impurities from exhaust gases utilizing such molten salt mixtures. Further, in copending application Ser. No. 13,246, filed Feb. 20, 1970, there is disclosed a method and muffler system where the exhaust gas first contacts the molten salt and then passes over a dry selected metal mesh. In U.S. Pat. No. 3,563,029 a muffler device is shown for the removal of particulate lead from the exhaust gases of an internal combustion engine by absorption of the lead particulate matter in various flux compositions. Indicated flux compositions include sodium hydroxide, potassium hydroxide, mixtures thereof, sodium and potassium acetates, phosphoric acids, and sodium hydrogen phosphates. In application Ser. No. 13,247, filed Feb. 20, 1970, now U.S. Pat. No. 3,647,394, there is disclosed a muffler device utilizing a venturi construction within the inlet line through which the exhaust gas passes together with means for aspirating a liquid reactant material into the exhaust gas near the venturi throat.

The compact muffler device of the present invention, while utilizing various features disclosed in the foregoing patents and patent applications, provides specific further improvements over the muffler systems disclosed therein. The present device is particularly intended as an improvement over the device shown in U.S. Pat. No 3,647,394, which is incorporated herein by reference. In the device shown in FIG. 2 of U.S. Pat. No. 3,647,394, scrubbing of the exhaust gas principally occurs in a bottom sump region containing the molten salt. The scrubbed gas containing the molten salt then passes through an extensive packed region where additional scrubbing occurs, followed by demisting, prior to being exhausted. The flow is in a horizontal direction through both regions. The device shown in FIG. 7 of this patent has both the wetted mesh and the demister mesh arranged in a vertical configuration, the inlet line also being vertically oriented. For effective removal of impurities present in automotive exhaust gases in the various embodiments shown in U.S. Pat. No. 3,647,394, at least a 2-inch packed region is required for effective scrubbing, in addition to at least an inch of molten salt in the bottom pool. Since de-entrainment or demisting to be fully effective requires vertical passage of the gas in an upward or downward direction through the packing, another 3 to 4 inches is required for this step; a possible disengagement region between the scrubbing and demisting zones may also be required. Thus a minimum height of about 7 inches would ordinarily be required for effective scrubbing and de-entrainment, particularly with respect to the residence time constraints (about 0.03 sec.) which characterize automotive mufflers. Thus while the several devices shown in U.S. Pat. No. 3,647,394 are effective and useful for removing undesired impurities from automotive exhaust gas, they could not be utilized as direct replacement devices for ordinary automotive mufflers, which generally have an overall height of between 3.5 and 7.5 inches. Furthermore, the devices shown in FIGS. 2 and 7 of U.S. Pat. No. 3,647,394 rely upon the use of gravity for return of the molten salt to the sump region. This generally requires a greater residence time for the gas than is ordinarily available. Also, the greater molten salt quantities required in such devices make more likely the possible loss of the molten salt through the exhaust system when rapidly accelerating or decelerating the automobile, particularly in an up-hill position.

SUMMARY OF THE INVENTION

Accordingly, it is an object of the present invention to provide a compact muffler scrubber device which performs the usual acoustic functions of an automotive muffler and further provides effective scrubbing of the exhaust gas for removal of impurities and de-entrainment of the reactant scrubbing liquid from the scrubbed gas within available residence times and in a smaller overall height and volume than muffler devices heretofore available using such technology, particularly as set forth in U.S. Pat. No. 3,647,394. The scrubbing of the gas is particularly effective in removing particulate lead matter so that the scrubbed exhaust gas can be further reacted, where desired, in subsequent stages for further removal of NO and for oxidation of hydrocarbons and CO without "poisoning" the ordinarily lead-sensitive catalysts otherwise effectively utilizable in such subsequent stages. The design of the present muffler device results in the use of a smaller quantity of reactant material. Thereby the reactant liquid level in the device, and particularly near the gas outlet region, can be maintained at a low level, avoiding loss of reactant material under substantially all car operating modes, including high exhaust gas flow rates and accelerated or decelerated uphill and downhill operation.

The compact muffler scrubber of the present invention comprises a unitary housing in which shallow reactant and demister compartments are serially connected in a horizontal arrangement. The inlet tube of the muffler device is isolated in an inner chamber within the reactant compartment. A pressure gradient is established in the inlet tube and thereby throughout the muffler so as to promote the return of reactant material to the forward or upstream end of the reactant compartment. Thereby the liquid level of the reactant material is higher in the forward end of the muffler toward the engine and lower in the rear end of the muffler. This pressure gradient is established in the inlet tube by locating the venturi construction in this tube, as well as the aspirator tube which sprays the liquid reactant material into the venturi at this point, as far upstream as feasible, suitably at least in the forward fourth part of the muffler device.

The hot exhaust gas from the engine passes through the inlet tube, where it is spray-contacted at the venturi throat by liquid reactant material from the aspirator tube. It is then directed into the inner chamber of the reactant compartment which contains a suitable packing material for promoting initimate liquid-gas contact between the exhaust gas and the liquid reactant material, which is also present in this inner chamber. The exhaust gas, after traversing the packing in the inner chamber, is then directed in the opposite direction through the outer portion of the reactant compartment, which contains similar packing and reactant or absorbent material, by way of a de-entrainment passageway located in the upper forward end of the reactant compartment. An orifice of selected size is located in the forward bottom end of the reactant compartment so as to permit drainage of the liquid reactant material into the liquid reactant pool while at the same time providing a liquid trap which blocks passage of the exhaust gas into this liquid reactant pool thereby causing it to be directed through the de-entrainment passageway. Thus it is an important feature of the present device that by having such an arrangement of the liquid-draining orifice and the de-entrainment passageway, the reactant liquid is made to recirculate in the reactant compartment of the muffler with much less carryover of reactant liquid to the demister compartment. Thus a lesser amount of reactant liquid is required for effective gas scrubbing, and at the same time liquid loading on the demister packing is significantly reduced. Such a reduced amount of reactant liquid present in the demister compartment, together with appropriately located baffles, essentially eliminates the likelihood of reactant liquid being forcibly emitted from the exhaust outlet of the muffler during uphill operation of the car.

Thus it is a further feature of the present scrubber device that sloshing of the reactant liquid is further minimized, aside from the lesser liquid reactant loading, by providing baffled passageways in the bottom of the reactor device which include selected orifices which serve as surge suppressors.

It is yet another feature of the muffler scrubber device that an air inlet line may be connected to the aspirator device so as to draw air into the muffler thereby to oxidize NO to $NO_2$.

In another embodiment of this invention, additional stages may be provided as separate units or in an integral housing together with the present reactant and demister stages. Exhaust gas from the demister stage is then contacted with a dry catalytic material in a catalytic reactor to reduce NO to $N_2$. In an afterburner stage, the exhaust is then mixed with $O_2$ or air to convert CO to $CO_2$ and hydrocarbons to $CO_2$ and $H_2O$.

A preferred reactant or absorbent material for use in the muffler device, as shown in U.S. Pat. No. 3,647,394, is one which is solid at room temperature and which is molten at the temperature of the exhaust gas. The exhaust gas temperature may vary from below 400°C to above 800°C depending upon the speed at which the engine is operated and the distance from the exhaust manifold. Thus preferred in the practice of this invention are molten salts containing mixtures of alkali metal carbonates, particularly the ternary mixture consisting of potassium carbonate, lithium carbonate, and sodium carbonate, which has a melting point between 400° and 600°C. A particularly preferred absorbent is the ternary alkali metal carbonate eutectic, which melts at 397°C and consists of 43.5, 31.5, and 25.0 mole % of the carbonates of lithium, sodium, and potassium respectively.

The scrubber device is preferably filled by first melting the salt and then pouring the molten salt into the packing so as to obtain optimum dispersion of the molten salt throughout the packing before solidification of the salt occurs. During operation of the engine, because of direct contact by the exhaust gas with the packing and the dispersed salt therein in the reactant compartment, the absorbent salt is rapidly brought into the molten state. Thermal energy transfer from the hot exhaust gas to absorbent salt in the bottom of the reactant compartment is further facilitated by the use of a plurality of baffles which act as heat-transfer fins to form the pool of molten salt which forms at the bottom of the muffler device.

DESCRIPTION OF THE PREFERRED EMBODIMENTS

While utilizing several of the general principles and features of the muffler scrubber device shown in U.S. Pat. No. 3,647,394, the device of the present invention is an improvement thereover in that by its unique design it makes feasible the more rapid removal of impurities present in automotive waste gases within a smaller overall muffler device height and volume. The various unique features and resulting advantages characterizing the present muffler device will become more apparent from the following description of the several embodiments of the muffler device illustrating the present invention.

Figure 1:
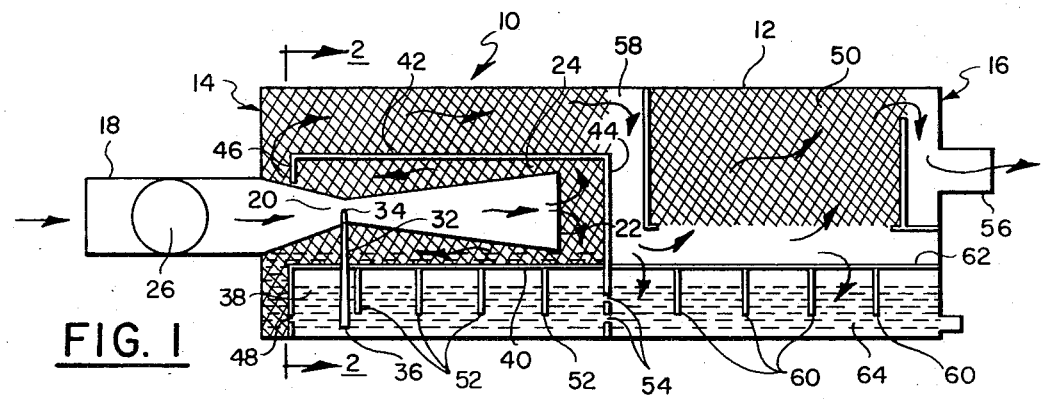
FIG. 1 is a side elevational view, in cross section, of the muffler device showing a serially connected horizontal arrangement of the reactant and demister compartments.

Referring to FIG. 1, there is shown a preferred embodiment of the muffler device 10 of the present invention. A housing 12 includes a reactant compartment 14 and a demister compartment 16. The exhaust gas from an internal combustion engine enters an inlet line 18 and passes through a venturi 20 and is ejected at the end 22 of inlet line 18 into an inner chamber containing a packing material 24, suitably a metal mesh, ceramic rings, or Raschig rings, to provide intimate scrubbing of the gas by the liquid reaction medium present in packing 24.

Figure 3:
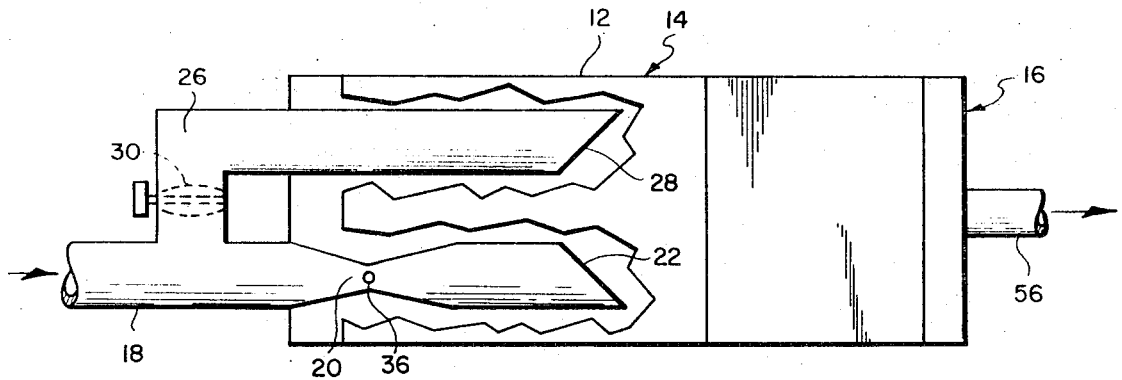
FIG. 3 is an overhead plan view of the muffler device of FIG. 1, partially cut away.

Muffler 10 is additionally provided with a bypass line 26 which intersects inlet line 18 outside of the muffler housing. The action of bypass line 26 is more clearly illustrated in FIG. 3 which shows a top plan view, partially cut away, of muffler device 10. Referring to FIG. 3, it is noted that bypass line 26 traverses the major portion of the length of compartment 14 present in housing 12. The bypass gas emerges at end 28 of bypass line 26 where it commingles with the exhaust gas leaving at end 22 of inlet line 18. Thus all the gas from the internal combustion engine is treated in compartment 14 whether or not it passes through the venturi 20. A pressure- and/or temperature-actuated valve 30 is disposed in bypass line 26. Adjustment of valve 30 permits for ready adaptability of the aspirator system to engines with varying exhaust flow characteristics. Valve 30 is preferably adjusted so that the venturi 20 will operate at a reasonably consistent pressure, which is a minimum pressure, which is below the maximum pressure present at the entrance to inlet line 18 and below the intermediate pressure present at the end 22 of inlet line 18.

Figure 2:
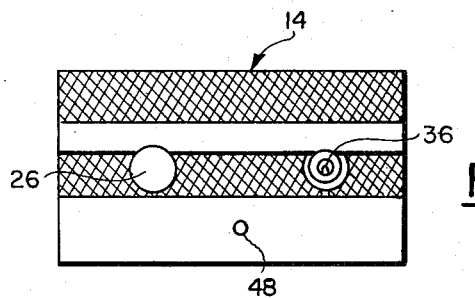
FIG. 2 is a cross-sectional view taken along the lines 2—2 of FIG. 1.

Again referring to FIG. 1, and also to FIG. 2 which is a cross-sectional view taken along the lines 2—2 of FIG. 1, it is noted that an aspirator tube 32 has a nozzle end 34 disposed in the venturi 20 of inlet line 18. The bottom end 36 of aspirator tube 32 is disposed in a pool 38 of the reactant liquid in the bottom of the muffler housing. As the exhaust gas flows through venturi 20, reactant liquid from pool 38 will be aspirated through tube 36 into the exhaust gas stream, reacting with the impurities present in the exhaust gas and also being carried along by entrainment in the gas stream to packing 24. Nozzle 34 facilitates the dispersion of the aspirated liquid reactant as a fine spray in the exhaust gas stream to provide good contact between the reactant liquid particles and the exhaust gas. By way of example, it has been found that nozzles having an inner diameter of up to about 0.08 inch provide satisfactory dispersions of liquid into the exhaust gas.

Under normal vehicle operating or driving conditions, most of the exhaust gas stream will flow through the venturi 20. Under high engine loads, or at high vehicle velocities and on uphill grades, the pressure and temperature upstream of the venturi section can increase significantly. Valve 30 is actuated at a pre-set pressure and/or temperature so as to then direct a portion of the exhaust gas through the bypass cooling line 26 directly into the inner chamber of reactant compartment 14. At all times, however, a portion of the exhaust gas will be continuously flowing through the venturi section 20 to achieve the desired aspirating function while the automobile is operating. Generally at normal operating-driving conditions, the system described would receive full exhaust gas flow through venturi 20. However, under conditions of high acceleration or high-speed driving it may be more economical to bypass a portion of the exhaust gas around the venturi system. Also, it is particularly desirable and effective for the purposes of this invention to locate the venturi 20 and aspirator tube 36 as far forward or upstream in compartment 14 as feasible, suitably in the forward quarter of the muffler, so as to provide an effective negative pressure in the venturi section for aspirating the liquid reactant droplets therein.

The portion of the inlet line within the muffler housing is enclosed within an inner chamber defined by bottom wall 40, top wall 42, and side walls 44 and 46. Thereby the exhaust gas is forced back through the mesh in an upstream direction after leaving end 22 of inlet tube 18. A layer of liquid reactant, e.g., molten salt, at the forward end of the muffler adjacent an orifice 48 acts as a trap allowing the scrubbed gas to flow only in an upward direction as it leaves the inner chamber. At this point, because of the sharp change in direction of the gas flow, partial de-entrainment of reactant liquid present in the gas stream occurs. The scrubbed gas now flows in a downstream direction along the outer region of compartment 14, which also is filled with packing 24, before entering demister region 12 by way of a passageway 58. Orifice 48 is sized so as to control the gradual flow of reactant liquid from packing 24 in compartment 14 into the liquid pool 38.

Various liquid reactant, scrubbant or absorbent materials may be utilized in the compact muffler device of the present invention for the removal of impurities from exhaust gases. Contemplated liquid scrubbing media include molten salt mixtures, liquid metals, organic sorbents, and aqueous solutions. However, practically utilizable liquid scrubbants must meet a variety of stringent requirements for use in the present muffler device. The liquid absorbent must be economical to use, readily available, and effective in rapidly removing a substantial portion of a wide variety of impurities present in the exhaust gases from internal combustion engines, particularly acidic impurities such as sulfur oxides, nitrogen oxides, and lead halides, as well as carbonaceous and lead-containing particulate matter. This treatment of the exhaust gas must be accomplished within a relatively short residence time in the muffler, less than 0.05 sec., avoiding undue pressure drops in the system and utilizing amounts of absorbent material that can be contained within the shallow spatial configurations of typical automotive mufflers. Frequent replacement or replenishment of exhausted or lost absorbent must also be avoided. At the same time the absorbent material must be relatively noncorrosive to the muffler housing and be effective at muffler temperatures without reacting or decomposing to give noxious or other undesired products. Thus aqueous solutions are generally impractical for use because of the short residence times available for effective absorption and because the high temperatures encountered in the muffler would result in rapid loss of solution which would require replenishment at impracticably frequent intervals. It is preferred to employ as the absorbent material inorganic salts which are solid at room temperature and become molten or liquid at the normal operating temperatures encountered in the operation of an internal combustion engine. Muffler temperatures may vary widely, from about 200° to 800°C, depending upon the warm-up time, speed and mode of operation of the automobile, and the distance from the exhaust manifold. Preferred molten salts which satisfy many of the foregoing criteria are those containing alkali metal carbonates as active absorbent. Exemplary is a molten salt system containing at least 2 wt.% of the ternary eutectic composition consisting essentially of, in mole percent, 25 ± 5 potassium carbonate, 45 ± 5 lithium carbonate, and 30 ± 5 sodium carbonate, which eutectic composition melts at about 397°C. The molten salt scrubbant may consist only of this ternary eutectic mixture to avoid frequent replenishment or replacement of the active scrubbant material. Or it may be combined with non-reactive salts which serve as inexpensive diluents or as temperature depressants. Such molten salt systems, which are disclosed in U.S. Pat. No. 3,438,722 for removing sulfur oxide impurities from combustion gases and in U.S. Pat. No. 3,647,394 for use in a muffler device, are utilizable in the muffler device of the present invention. Accordingly, the invention will be particularly described with respect to use in the muffler of the particularly preferred molten carbonate absorbent.

A wide variety of packing materials of different shapes and compositions may be utilized as the packing present in the reactant compartment. The packing serves to significantly increase the contact between the molten absorbent and the gas by preventing channelling of the gas through the reactant compartment and by providing a markedly available enhanced surface area. In general, saddle-shaped packing materials or Raschig rings are preferred. These are suitably made of various high-temperature ceramic materials, although corrosion-resistant metals may also be utilized. A packing consisting of metal mesh is also suitable for use provided it is arranged so as to minimize channelling effects.

Referring again to FIG. 1, in assembling the muffler device the absorbent material to be used is preferably first brought into the molten state and then added in liquid form to packing 24 in reactant compartment 14. Thereby the absorbent is thoroughly dispersed throughout the packing, some of it collecting in the bottom of the muffler to form pool 38. During operation of the internal combustion engine, the hot exhaust gas which enters inlet line 18 and leaves at end 22 is impinged at high velocity onto the packing 24. Because of the partial de-entrainment of the liquid reactant material that occurs prior to its leaving reactant compartment 14, there is a relatively light loading of liquid absorbent on packing 50 in compartment 16 so that complete demisting of the exhaust gas is accomplished in compartment 16. A dry gas then exits through exhaust outlet 56. (In a further embodiment of this device, illustrated in FIG. 6, the dry gas leaving compartment 16 may first be directed into additional compartments for further removal of gaseous impurities still contained therein.) Baffles 60 present in demister compartment 16 serve as heat-transfer fins as well as surge suppressors. Since bottom wall 62 is perforated, in contrast to the solid bottom wall 40 in reactant compartment 14, some of the exhaust gas entering demister compartment 16 makes contact with the molten absorbent present in pool 64 in the bottom of compartment 16. Packing 50 serves to remove the entrained molten carbonate particles present in the gas stream. It preferably consists of a self-supported metal mesh containing a maze of many layers of fine wire. The exhaust gas easily flows around the individual wires and through the mesh openings, but the relatively heavy liquid droplets of molten carbonate cannot change course so readily and, instead, impact on the wires. Surface tension adheres the liquid to the wire, and the collected droplets coalesce into larger drops which eventually drip from the bottom portions of the mesh onto the perforated bottom wall 62 and then drain into pool 64.

Figure 4:
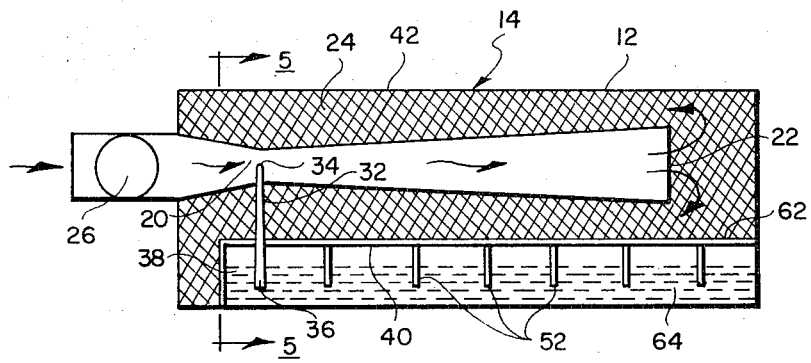
FIG. 4 is a side elevational view, in cross section, of another embodiment of the muffler device wherein the reactant and demister compartments are serially disposed in a horizontal plane, but in a direction normal to one another.
Figure 5:
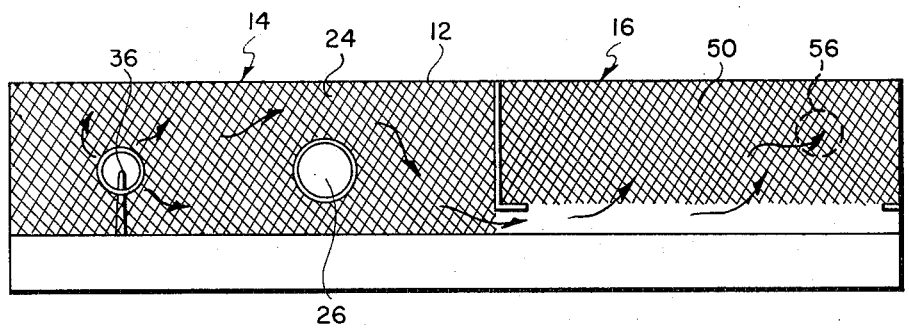
FIG. 5 is a cross-sectional view taken along the lines 5—5 of FIG. 4.

In FIGS. 4 and 5 is shown a further embodiment of the muffler device of the present invention, the same numerals as used in FIG. 1 being used in referring to corresponding parts. FIG. 4 shows a side elevational view, in cross section, of the muffler device wherein the reactant and demister compartments are serially disposed in a horizontal plane, but in a direction normal to one another. Since the present compact muffler device is intended for the removal of impurities from waste gases within the constraints imposed by existing automotive designs with respect to residence time and height and volume requirements, the device embodiment illustrated in FIGS. 4 and 5 is utilized where a more rectangular and less elongated configuration of a muffler device than that shown in FIG. 1 is required by the spatial requirements imposed by the automobile to which it is connected. FIG. 5 represents a cross-sectional view taken along the lines 5—5 of FIG. 4. Essentially the same treatment of the exhaust gas occurs in the embodiment of the muffler device shown in FIGS. 4 and 5, and substantially the same structural features which characterize the device shown in FIGS. 1 and 2 are also present in this device embodiment.

Figure 6:
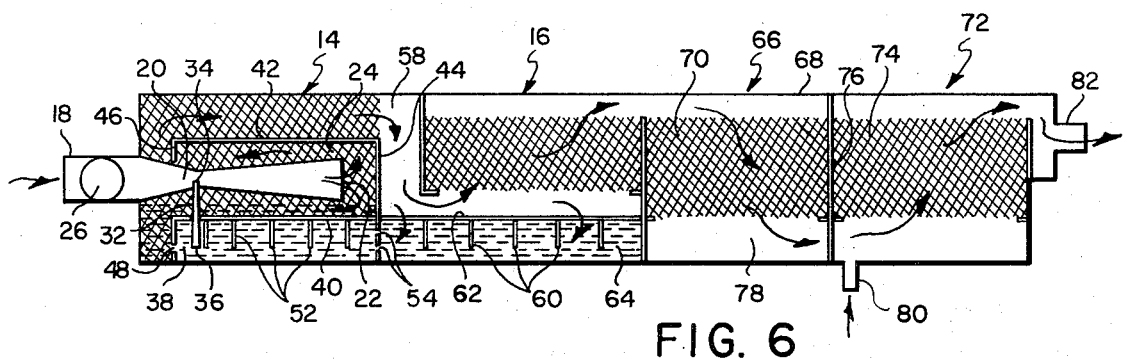
FIG. 6 is a schematic sectional view in which two additional stages are provided for the muffler device.

FIG. 6 represents a further embodiment of the muffler device of the present invention in which an integral muffler unit is provided in which four horizontally disposed and serially connected compartments are utilized for essentially complete removal of all impurities present in the exhaust gas of an internal combustion engine. Compartments 14 and 16 of FIG. 6 correspond, respectively, to reactant compartment 14 and demister compartment 16 as shown in FIG. 1. After the dry exhaust gas leaves compartment 16 of FIG. 6, it is directed by a suitably baffled passageway to the upper part of a catalytic reactor compartment 66, instead of being exhausted to the atmosphere. Compartment 66 is comprised of an insulated housing 68, insulated with asbestos material or other suitable known insulator. Thereby the catalytic reaction within this compartment can take place at optimum temperature conditions which are obtainable when the exhaust gas is at the operating temperature of the engine. The gas entering the catalytic reactor 66 is free of lead impurities. These have been previously removed therefrom by the molten carbonate in compartment 14. Therefore there is no lead present in the exhaust gas which ordinarily would "poison" the catalytic material 70 present in compartment 66. While a certain amount of NO will have been removed from the exhaust gas by passage through compartments 14 and 16 by reaction with the molten carbonate present in these compartments, catalytic reactor 66 serves to reduce any NO remaining in the exhaust gas by reacting the NO with the CO present in the exhaust gas in the presence of a catalyst in accordance with the following primary reaction:

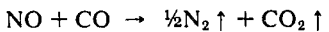

$$NO + CO \rightarrow \tfrac{1}{2}N_2 \uparrow + CO_2 \uparrow$$

Any known catalyst useful for effecting the foregoing reaction may be utilized in compartment 66, such as platinum-supported catalysts or copper or nickel or copper-nickel alloys of fine wire mesh such as Monel alloy mesh.

Because of the baffled arrangement present, the exhaust gas is downwardly directed through catalytic material 70 in reactor compartment 66 into a passageway 78. It is then upwardly directed through an opening present in the lower portion of baffle 76 into an afterburner compartment 72 and upwardly through a catalytic material 74. This material may be similar to catalytic material 70 utilized in catalytic reactor compartment 66. Air is admitted by way of an inlet 80 into compartment 72. The principal reactions occurring in compartment 72 are the conversion of CO to $CO_2$ and of hydrocarbons (HC) to $CO_2$ and $H_2O$ in accordance with the following reactions:

$$CO + \tfrac{1}{2}O_2 \rightarrow CO_2$$

$$2(HC) + 1\tfrac{1}{2}O_2 \rightarrow CO_2 + H_2O.$$

Under ideal conditions, the finally treated exhaust gas leaving compartment 72 by way of an exhaust outlet 82 is thus essentially free of all impurities initially present and contains only carbon dioxide and water vapor.

EXAMPLE

A muffler scrubber device essentially similar to that illustrated in FIG. 1 was constructed as a substitute for a standard exhaust muffler of a 1969 Pontiac automobile having a 400-cu. in. eight-cylinder engine. The scrubber device was constructed of stainless steel and had an overall height of 5 inches, a width of 9 inches, and a length in the axial direction of 23.5 inches. Inlet tube 18 had a diameter of 2.5 inches, with the constricted throat portion 20 reduced to a diameter of 0.80 inches. Orifice 48, which controlled the flow of the molten carbonate into sump region 38, had a diameter of 0.12 inches. The enhanced surge suppressor action provided by orifices 54 consisted of three vertically arranged holes, each having a diameter of 0.25 inches. Before welding wall 42 in place, the inner chamber surrounding the inlet tube was tightly packed with a knitted fine wire mesh of stainless steel. The wire mesh had a 90 percent void volume and was made up of 11-mil wire. This mesh was also used to pack the entire outer region of reactant compartment 14 and was also used as the packing in demister compartment 16. The mesh was so folded in compartments 14 and 16 so as to minimize channelling effects. The scrubbant used consisted of 9½ pounds of the Na-K-Li carbonate ternary eutectic. The salt mixture was melted and poured as a molten liquid over the mesh present in the inner chamber of compartment 14 before welding wall 42 in place. Aspirator tube 34 was a stainless steel tube having an 0.08-inch I.D. and an 0.18-inch O.D. This tube was located in the front fifth of compartment 14, about 2.75 inches from the intake end. Nozzle 34 of the aspirator tube consisted of a bevelled edge so angled as to shear the aspirated molten salt into fine droplets to provide an atomizing effect for intimate contact with the exhaust gas. Based on the flow rate of the gas during normal and accelerated operation, it was calculated that the residence time for molten salt-gas contact was about 0.03 seconds.

The 1969 Pontiac automobile used for the test had an initial mileage of 30,000 miles. With the car's original muffler still in place, a standard control test was run. Four cold-cycle readings (car exposed to room temperature for minimum of 12 hours) were taken; then immediately following turnkey operation, the remaining cycles of the standard California dynamometer seven-mode cycle, shown below in Table 1, were run. Completion of all seven modes of operation constituted a single cycle, measurements being made on a chassis dynamometer. After the car had been brought to normal operating temperature, four hot cycles were run.

The standard exhaust muffler was then removed, and the above-described muffler scrubber was welded in its place between the engine exhaust port and the tail pipe. The automobile was then driven over a fixed course under recommended standard conditions, with measurements using the California dynamometer seven-mode cycle being taken at various mileages for both cold-cycle and hot-cycle readings. Measurements were taken at periodic intervals up to a total mileage of about 42,000 miles. The gasoline used was a representative leaded gasoline containing 2.5 grams per gallon as lead. An absolute filter was used to retain all particulate matter emitted from the tail pipe exhaust. The total particulate matter emitted was then analyzed for its lead content. The particulate emission was calculated in terms of grams per mile for total particulate emission and lead particulate emission. The percentage of lead burned was then determined.

The results obtained are shown in Table 2. As may be noted from Table 2, the percentage of lead removed (as percent of lead burned) for the car using the standard muffler was 81 and 76.8 percent (for hot-cycle and cold-cycle data, respectively). For the car equipped with the scrubber of this invention in place of the standard muffler, at the additional 10,486- and 12,000-mile points (total mileage of 40,486 and 42,000 miles), the percentage of lead removed (100 minus % Pb burned) for the hot cycles was 99.6 and 99.8, respectively, and for the cold cycles 83.1 and 76.4, respectively. It should further be noted that when a standard muffler is used, lead is retained within the engine and within the standard muffler. Under conditions of high-speed rapid acceleration, such retained lead may still further be emitted. However, the lead retained in the molten absorbent in the scrubber device will not be emitted under similar driving conditions.

TABLE 1

CALIFORNIA DYNAMOMETER 7-MODE CYCLE

| Mode | | Time in Mode | Weighting Factor |
|---|---|---|---|
| | mph | sec | |
| 1 | Idle | 20 | 0.042 |
| 2 | (0–25) | 11.5 | 0.244 |
| | (25–30) | 2.5 | Data Not Read |
| 3 | 30 | 1.5 | 0.118 |
| 4 | 30–15 | 11 | 0.062 |
| 5 | 15 | 15 | 0.050 |
| 6 | (15–30) | 12.5 | 0.455 |
| | (30–50) | 16.5 | Data Not Read |
| 7 | 50–20 | 25 | 0.029 |
| | 20–0 | 8 | Data Not Read |

TABLE 2

PARTICULATE EMISSION - Gms/Mile

| | 4 Cold Cycles | | | 4 Hot Cycles | | | 35/65 (Cold/Hot) Composite | | |
|---|---|---|---|---|---|---|---|---|---|
| Miles | Total | Pb | % Pb Burned | Total | Pb | % Pb Burned | Total | Pb | Pb Burned |
| | | | | Standard Muffler on Car | | | | | |
| 30,000 | 0.362 | 0.060 | 23.2 | 0.276 | 0.041 | 19.0 | 0.306 | 0.048 | 20.5 |

TABLE 2 — Continued

PARTICULATE EMISSION - Gms/Mile

| | 4 Cold Cycles | | | 4 Hot Cycles | | | 35/65 (Cold/Hot) Composite | | |
|---|---|---|---|---|---|---|---|---|---|
| Miles | Total | Pb | % Pb Burned | Total | Pb | % Pb Burned | Total | Pb | Pb Burned |
| | | | | Scrubber Muffler on Car | | | | | |
| 333 | 0.199 | 0.093 | 39.4 | 0.091 | 0.005 | 2.7 | 0.129 | 0.036 | 15.5 |
| 3,640 | 0.263 | 0.154 | 56.0 | 0.072 | 0.022 | 10.6 | 0.138 | 0.068 | 26.5 |
| 7,426 | 0.071 | 0.039 | 14.3 | 0.049 | 0.021 | 9.4 | 0.057 | 0.027 | 11.1 |
| 10,486 | 0.091 | 0.048 | 16.9 | 0.044 | 0.001 | 0.4 | 0.060 | 0.017 | 6.2 |
| 12,000 | .113 | .066 | 23.6 | .053 | — | 0.2 | | | |

It will of course be realized that various modifications can be made in the design and operation of the muffler device of the present invention without departing from the essential features and spirit thereof. While exemplary and preferred materials of construction and details of operation have been described, these may require modification for optimization depending upon specific conditions of operation. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

We claim:

1. A compact muffler for treating the exhaust gas of an internal combustion engine to remove impurities therefrom comprising:

an enclosed unitary housing adapted for connection in the exhaust system of the engine, said housing including shallow reactant and demister compartments serially connected in a horizontal arrangement, a sump region in the bottom of said housing containing a body of an absorbent material which is solid at room temperature and which forms a molten pool for absorbing and reacting with said impurities upon increasing the temperature of said body above its melting point, heating means to maintain said absorbent material in the form of a molten pool, said heating means including means for the transfer of thermal energy from the exhaust gas to said absorbent material, an inlet line disposed in the reactant compartment of said housing and including an inlet port of one end thereof adapted to receive the impurity-containing exhaust gas from an exhaust gas manifold of said engine and including outlet means at the other end thereof for directing said exhaust gas within said reactant compartment, venturi means including a constricted throat portion disposed in said inlet line between said inlet port and said outlet means and located in the forward end of the reactant compartment so as to establish a pressure gradient in said inlet line during operation thereby promoting the return of absorbent material to the forward end of said reactant compartment, means for aspirating the molten absorbent material into said exhaust gas including a line having one end disposed in said molten pool and the other end disposed in said constricted throat portion and including spray means for producing a dispersion of liquid droplets in said throat portion to provide exhaust gas-molten material contact area, bypass conduit means communicating with said inlet line prior to said venturi means for conducting exhaust gas from said engine to bypass said venturi means and to regulate the pressure thereacross and to conduct the bypassed portion of said exhaust gas to another region of said reactant compartment to intermix with the exhaust gas exiting from said venturi means, said bypass conduit means including valve means at least responsive to the pressure of the exhaust gas stream entering said venturi means, contacting means including a packing disposed in said reactant compartment, said packing being in horizontal axial alignment with and circumferentially surrounding said outlet means of said inlet line whereby the exhaust gas upon leaving said outlet means impinges on said packing providing for further exhaust gas-molten material contact area, wall members partially enclosing said outlet means of said inlet line, whereby the exhaust gas enters said packing in a downstream direction and then is directed back through said packing in an upstream direction by said wall members, drainage control means including an orifice of selected size in the forward bottom end of the reactant compartment so as to permit drainage of molten absorbent material into the molten pool under said pressure gradient while at the same time providing a liquid trap which blocks passage of the exhaust gas into the molten pool thereby causing said exhaust gas to be directed through said packing, a passageway serially connecting said reactant and demister compartments and directing the hot exhaust gas containing entrained molten material upwardly through said demister compartment, demisting means including a packing disposed in said demister compartment for separation of entrained molten material from said exhaust gas to provide a resultant dry exhaust gas, and an outlet port disposed in said demister compartment and positioned downstream from said demister packing for discharging the dry purified exhaust gas from said housing.

2. The muffler device of claim 1 wherein said body of absorbent material contains at least 2 wt.% of an active absorbent salt consisting of an alkali metal carbonate.

3. The muffler device of claim 2 wherein said body of absorbent material contains at least 50 wt.% of the active absorbent salt which consists of a ternary mixture of the carbonates of lithium, sodium, and potassium.

4. The muffler device of claim 3 wherein said active absorbent salt is a eutectic composition molten above 395°C and consisting essentially of, in mole percent, 45 ± 5 lithium carbonate, 30 ± 5 sodium carbonate, and 25 ± 5 potassium carbonate.

5. The muffler device of claim 1 wherein said reactant compartment includes a de-entrainment passageway located in the forward end of said compartment for removing a portion of entrained molten material from the exhaust gas following exhaust gas-molten material contact.

6. The muffler device of claim 1 further including surge suppressor means disposed in said molten pool.

7. The muffler device of claim 6 wherein said surge suppressor means includes a baffle containing a plurality of orifices.

8. The muffler device of claim 1 further including a first exhaust gas treatment compartment positioned downstream from said demister compartment, said first treatment compartment including separate catalyst means for receiving and treating the dry exhaust gas from said demister compartment, and still further including a second exhaust gas treatment compartment positioned downstream from said first treatment compartment and including separate catalyst means for receiving and oxidatively treating the dry exhaust gas from said first treatment compartment prior to emitting said gas from the muffler device.

* * * * *